June 23, 1964 M. H. DOLE 3,138,412
BEARING ASSEMBLY
Filed Oct. 2, 1961 2 Sheets-Sheet 1
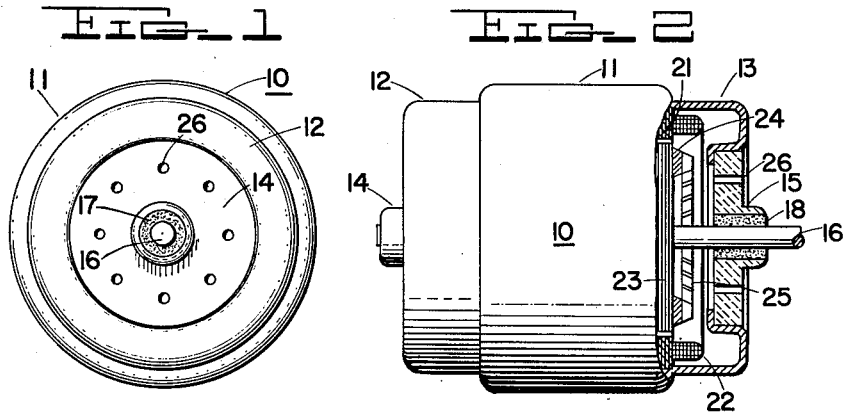
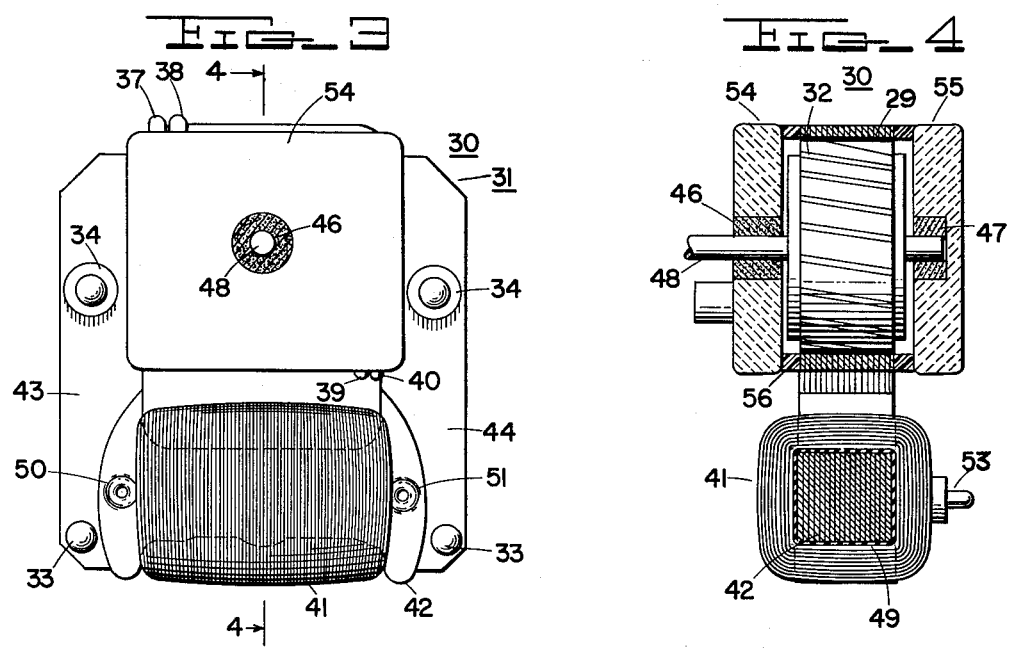
INVENTOR.
Marshall H. Dole,
BY
Attorney.

June 23, 1964

M. H. DOLE 3,138,412

BEARING ASSEMBLY

Filed Oct. 2, 1961

INVENTOR.
Marshall H. Dole,
BY
Attorney.

United States Patent Office 3,138,412
Patented June 23, 1964

3,138,412
BEARING ASSEMBLY
Marshall H. Dole, Hudson, Ind., assignor to General
Electric Company, a corporation of New York
Filed Oct. 2, 1961, Ser. No. 142,264
10 Claims. (Cl. 308—121)

This invention relates in general to bearing assemblies and more particularly to a lubricant reservoir and bearing arrangement for rotating machines such as electric motors.

Conventional lubricant reservoir and sleeve bearing arrangements generally involve a somewhat complex assembly of parts. A commonly used means for holding a reserve supply of lubricant is a felt wick or washer. Where the sleeve bearing is formed of porous metal, such as sintered bronze, a portion of the felt wick which is charged with the lubricant engages the bearing and releases lubricant to the bearing as needed by capillary action. The use of felt wicks or washers has required that mechanically rigid enclosures be provided to hold the felt in position and to prevent contamination and loss of lubricant. In order to effectively achieve these functions, the enclosures are usually fabricated of several parts sealed at the joints thereof by means of gaskets or other sealing means. The failure of the seal at the joints frequently results in a premature failure of the bearing because of the loss of the lubricant. Further, it is required in such conventional arrangements that the bearing be supported by some means other than the wick or enclosure. Therefore, there is a need for a less complex assembly involving a minimum number of parts that will reliably perform the functions of storing an adequate supply of lubricant, providing a sealed enclosure for the lubricant, releasing the lubricant to the bearing as required at a predetermined rate, and providing mechanical support for the bearing.

In small dynamoelectric machines, such as fractional horsepower motors, it is frequently desirable, if not necessary, that the lubrication system be capable of providing bearing lubrication for many years without reoiling. For example, in applications of fractional horsepower motors to refrigerators, it is normally expected that the motor provide maintenance-free service for a period of approximately from 15 to 20 years. In order to achieve this function, it is required that the lubricant reservoir or other suitable lubricant storing means hold a sufficient amount of lubricant and supply the lubricant to the bearings at a slow rate. This rate for small motors may be on the order of one-tenth of a cubic centimeter per thousand hours of motor operation. It is, therefore, desirable to provide a sleeve bearing assembly incorporating a lubrication system that is capable of storing a sufficient quantity of lubricant and releasing the oil to the bearing as necessary to maintain adequate lubrication of the bearing. Further, it is desirable to provide a sleeve bearing assembly comprised of a minimum number of parts that can be economically manufactured.

Accordingly, it is a general object of this invention to provide a new and improved bearing assembly for rotating machines.

Another object of the invention is to provide an improved bearing assembly requiring a minimum of parts.

It is still another object of the invention to provide an improved lubricant reservoir and bearing arrangement wherein the lubricant reservoir serves as a bearing support and end shield member for the motor.

A further object of the invention is to provide an improved bearing assembly that can be economically manufactured.

In its broader aspects, the invention provides a lubricant reservoir formed of a body of lubricant absorbent ceramic material having a surface contacting a bearing member and adapted to feed lubricant thereto. The bearing member is disposed in an opening provided in the lubricant reservoir. A shaft is rotatably journaled in the bearing. The surface of the lubricant reservoir in contact with the bearing is adapted to feed lubricant thereto so that a lubricating film is maintained between the bearing and the journal surface of the shaft. The reservoir, preferably, serves as a support member for the bearing member.

In a preferred embodiment of the invention, the lubricant reservoir is provided with a glazed surface or coating arranged so that the lubricant is effectively retained within the lubricant reservoir. The glazed surface is impervious to the lubricant and thereby prevents escape of the lubricant from the reservoir and contamination of the lubricant by foreign matter entering into the reservoir. The surface contacting the bearing is unglazed so that lubricant is fed to the bearing by capillary action at a relatively slow rate.

The subject matter of the invention is particularly pointed out and distinctly claimed in the concluding portion of this specification. The invention, however, both as to organization and method of operation, together with further objects and advantages thereof, may be best understood by reference to the following description taken in conjunction with the accompanying drawing in which:

FIG. 1 is a front elevational view showing an embodiment of the invention wherein the improved lubricant reservoir of the invention is utilized in a rotating machine;

FIG. 2 is a side elevational view, party in section and partly broken away, of the rotating machine shown in FIG. 1;

FIG. 3 is a front elevational view of an electric motor embodying another form of my invention;

FIG. 4 is a sectional view, taken on line 4—4 of the motor illustrated in FIG. 3.

Figure 5:
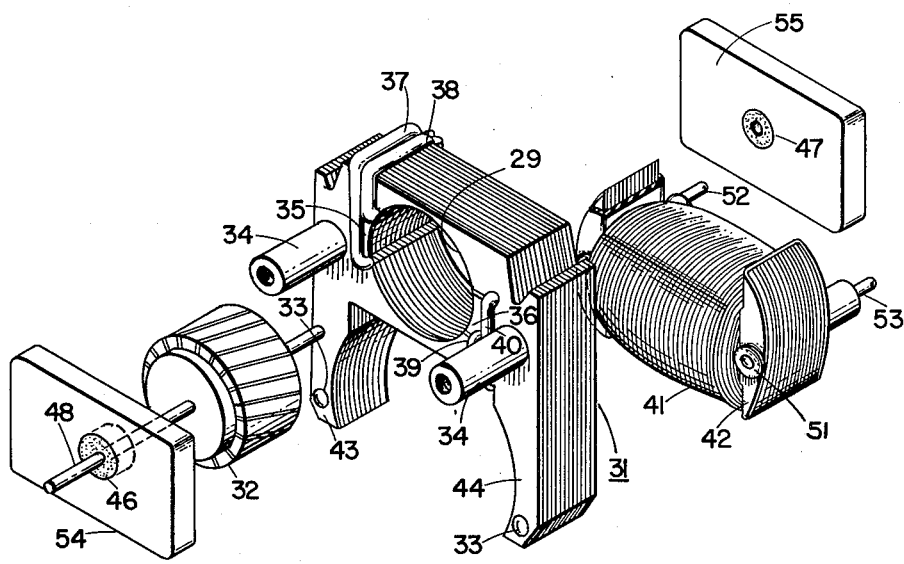
FIG. 5 is an exploded view of the motor shown in FIG. 3 illustrating the various components in perspective.

Referring now more particularly to FIGS. 1 and 2, a small dynamoelectric machine, generally identified by reference numeral 10, is shown therein. The dynamoelectric machine 10 includes a stator frame 11, a pair of end shields 12, 13, a pair of lubricant reservoirs 14, 15 and a shaft 16 rotatably journaled in a pair of sleeve type of bearings 17 and 18. As is shown in FIG. 2, it will be seen that the lubricant reservoir 15 is formed with a longitudinally extending opening wherein the bearing 18 is fixedly disposed therein. The end shields 12, 13, which may be separate or integral portions of the stator frame 11, support the lubricant reservoirs 14, 15.

The improved lubricant reservoirs 14, 15 are comprised of a body of lubricant absorbent ceramic material. As used herein, the term "ceramic material" denotes generally products made from reducible metallic oxides alone or in combination with other compounds by firing the materials at an elevated temperature. Any lubricant absorbent ceramic material that possesses the requisite oil retention and release characteristics for a given application may be used in the practice of the invention.

In the exemplifications of the invention described herein, the retention characteristics of a ceramic material were determined by forming plugs 1 inch in diameter and ⅞ of an inch long under a load of 1 to 10 tons. The plugs were dried and fired. The ceramic plug was weighed and then impregnated with the lubricant under a vacuum. The plug was also weighed after it was charged with the lubricant in order to determine the amount of oil absorbed. The release characteristic of the sample plug was determined by periodically weighing the plug over a 100 day period to determine the rate at which the lubricant was released from the ceramic plug. Thus, it will be apparent that suitability of a particular ceramic material for use as a lubricant reservoir in accordance with the invention can be readily determined.

It was found that silica-alumina synthetic clays, having from 23 to 90 silica, 5 percent bentonite and a balance of alumina, could be used as lubricant absorbent ceramic materials for reservoirs in small motor applications. Although silica-alumina ceramic materials were employed in forming the lubricant reservoirs of the illustrative embodiments of the invention, it will be appreciated that other lubricant absorbent ceramic materials may be used.

Referring again to FIG. 2, it will be seen that the dynamoelectric machine 10 has a stator core member 21 which has a conventional winding 22 arranged thereon. A rotor 23 has an end ring 24 formed thereon with integrally cast fan blades 25. It will be noted that the lubricant reservoirs 14, 15 may be provided with a plurality of ventilating openings 26 having the proper relationship to the fan blades 25 so that air can be circulated through the dynamoelectric machine 10 at optimum efficiency. In some applications, it may be desirable to eliminate the ventilating openings 26. Thus, instead of forming the ventilating openings in the lubricant reservoirs 14, 15, suitable ventilating openings may be provided in the end shields 12, 13.

Although in illustrative embodiment of the improved lubricant reservoir arrangement of the invention shown in FIGS. 1 and 2, the lubricant reservoirs 14, 15 are formed of a body of lubricant absorbent ceramic material of substantially annular configuration, the lubricant reservoirs 14, 15 may be of any desired configuration which is best adaptable to a particular application. As for example, in the embodiment of the invention shown in FIGS. 3–5, a rectangular configuration was preferred in the shaded pole motor shown therein.

Preferably, all the surfaces of the lubricant reservoirs 14, 15 with the exception of the surface contacting the outer periphery of the bearings 17, 18 were glazed. The glazed used was a silica-alumina clay having a melting temperature below the melting temperature of the lubricant absorbing ceramic material used to form the body of the lubricant reservoirs 14, 15. It will be understood that a suitable glaze should have a coefficient of expansion that is substantially the same as the ceramic material used to form the lubricant reservoir. Further, it should have a melting temperature that is less than the melting temperature of the ceramic material on which it is applied so that it will form an impervious coating that will effectively contain the lubricant within the reservoir and prevent contamination of the lubricant stored in the reservoir.

The unglazed surface in contact with the bearings 17, 18 is adapted to feed lubricant thereto. It was found that an unglazed lubricant reservoir has a greater oil loss rate than a glazed lubricant reservoir. Thus, where it is desirable that where the oil contained in the reservoir must be fed to the bearings for the life of the dynamoelectric machine, which may be for extended periods as long as 15 years, the exterior surfaces of the improved ceramic reservoirs are preferably glazed.

In the illustrative embodiments of the invention, the lubricant reservoirs were filled or loaded with the lubricant before assembly. In the dynamoeletric machine 10 of FIGS. 1 and 2, the lubricant reservoirs 14, 15 were assembled on bearings 17, 18 respectively with an interference fit in order to insure an intimate contact therebetween. Since the lubricant reservoirs 14, 15 are tightly fitted in the openings provided in the end shields 12, 13, and thereby seal the outer periphery, it was not required to glaze the outer periphery of the lubricant reservoirs 14, 15.

The sleeve bearings 17, 18 used in the dynamoelectric machine 10 shown in FIGS. 1 and 2, were porous bearings of sintered bronze. Thus, the lubricant stored in the reservoirs 14, 15 is fed to the outer periphery of the bearings 17, 18 and thence through the pores of the bearings 17, 18 to the journal surfaces of the shaft 16. In this way, an adequate supply of oil is provided to maintain a lubricating film between the complementary surface of the journal and the surface of the bearings 17, 18.

Referring now to FIGS. 3, 4 and 5, there is shown therein the bearing lubricating arrangement of the invention embodied in a small shaded pole induction motor 30 of fractional horsepower size. The motor 30 includes a generally U-shaped laminated stator 31 and a rotor 32. The stator 31 is comprised of a plurality of superposed laminations secured in assembled relation by any suitable means, such as by rivets 33 which project through the aligned apertures formed in the laminations. Additional lamination securing means in the form of a pair of motor mounting pins 34 are provided at suitable locations on the stator 31. The bight portion of the U-shaped stator 31 is formed with a rotor receiving bore 29. The rotor 31 is disposed in the rotor receiving bore 29.

As is best seen in FIG. 5, a pair of shading pole projections or faces 35, 36 are diametrically disposed on the periphery of the bore 29, each pole projection 35, 36 being encircled by closed rings of copper 37, 38 and 39, 40 respectively positioned in suitable notches. The rings of copper wire 37, 38 and 39, 40 form shading coils and are disposed at the trailing ends of the stator pole faces. The shading coils accomplish the well-known shaded effect in the encircled field pole projection.

The magnetic flux for exciting the rotor 32 is provided by an electrical winding or coil 41 which is mounted on a core section or winding leg 42 of the stator 31. In the view shown at FIG. 3, it will be seen that the winding leg 42 is positioned between and in tight engagement with a pair of depending legs 43, 44 of the stator 31. The depending legs 43, 44 complete the flux path between the winding leg 42 and the pole faces. It will be noted that the winding leg 42 is pressed into position between the depending legs 43 and 44 after the coil 41 is wound thereon.

Turning to the view shown in FIG. 4, rotor 32 is mounted in spaced relation to bore 28 and is rotatably journaled in a pair of bearings 46, 47 by means of a shaft 48. The rotor 32 is formed of a plurality of stacked laminations of magnetic material with a squirrel cage winding of conductive material disposed in slots formed therein. The magnetizing coil 41 is comprised of a plurality of turns of wire such as copper magnet wire and is insulated from the winding leg 42 by a suitable insulating means. A layer 49 of integral insulation is provided on the winding leg 42, and serves as the insulating means. The laminations of the winding leg 42 are held in superposed relation by any suitable means such as the securing arrangement generally indicated by reference numerals 50, 51, which includes the terminals 52 and 53 provided for connecting the magnetizing coil 41 to a power source (not shown).

In accordance with the invention, the bearings 46, 47 are fixedly held in lubricant reservoirs 54, 55 which are comprised of a body of lubricant absorbent ceramic material. The reservoirs 54, 55 are rigidly attached to the depending legs 43, 44 of the stator 31 by some suitable attaching means 56, such as an epoxy glue. Thus, it will be seen that in this embodiment of the invention the reservoirs 54, 55 not only serve as brackets to support the bearings and as enclosures for containing lubricant but also serve as end shields. The bearings 46, 47 were fabricated of relatively porous sintered bronze material. During operation, the lubricant held in the porous interior of the ceramic member slowly seeps through the pores of the bearings 46, 47 to keep the bearing surface supplied with a lubricant so that a lubricating film is maintained between the journal surfaces of shaft 48 and the bearings 46, 47.

The lubricant absorbent reservoirs 54, 55 were formed from a rectangular shaped extrusion of silica-alumina synthetic clay by slicing the extrusion to form pieces of the desired width. The openings provided for bearings 46, 47 were cut in the clay before firing. The clay pieces were dried at 130° centigrade and fired at 1860° Fahrenheit. After firing, the bearing openings were drilled to the desired size. The clay pieces were glazed over the entire surface except for cylindrical surface defining the bearing openings and refired at 1860° Fahrenheit. The bearings 47, 46 were then cemented into the opening formed in the lubricant reservoirs 54, 55 with an epoxy glue and fixedly disposed therein. The lubricant reservoirs 54, 55 were assembled on th estator 31 by cementing the reservoirs 54, 55 thereto while the rotor 33 was held in spaced relation with respect to the stator 31 by means of shims. An epoxy glue was used as a cement and was cured by placing the motor assembly in an oven. After the epoxy glue had cured, the shims were removed from the air gap. The lubricant reservoirs 54, 55 were charged with a lubricant under a vacuum of approximately 1 millimeter of mercury.

In accordance with the invention, a small fractional horsepower motor similar in construction to motor 30 shown on FIGS. 3, 4 and 5 and having a pair of lubricant reservoirs which were approximately $1\frac{1}{16}$ inch by $1\frac{5}{16}$ inches by $\frac{5}{16}$ inch in size, was tested for thermal shock by running the motor for six hours while subjecting the motor alternately for half hour periods to a temperature of minus 65° C. and to a temperature of 120° C. The motor satisfactorily passed such a thermal shock test.

Considering all of the above, it will be seen that I have provided a new and improved bearing lubricating and support arrangement which may be used for many different applications. While the utility of the invention has been decsribed in connection with dynamoelectric machines and more particularly fractional horsepower motors, it will be understood that the invention is adaptable to other types of rotating machines. The lubricating and bearing support arrangement is effective to provide lubricating service to bearings for extended periods of time without need for reoiling or other maintenance. By glazing the surface of the lubricant reservoirs, the lubricant in the ceramic body is effectively protected from the surrounding atmosphere. If desired, breather openings may readily be provided on the surface.

The lubricant reservoir formed of lubricant absorbent ceramic material in accordance with the invention performs functions that were generally performed in the past by a number of separate elements such as an end shield, felt wick, a reservoir and an end cap. The lubricant reservoir in accordance with the invention may be used to perform any or all of these functions and eliminates the complex mechanical structure heretofore required to support bearings and to provide lubrication to the bearing and journal surface of the shaft rotatably supported by the bearing. The improved lubricant reservoir does not require the use of sealed joints to effectively retain the lubricant and minimizes the possibility of premature bearing failures caused by loss of lubricant resulting from defective seals. Further, the lubricant reservoir of the invention is comprised of a single part which can be economically manufactured and assembled on a motor or other rotating machine.

It will be understood that the exemplifications of the invention which have been described herein are intended for the purpose of illustrating and explaining the invention. Since it is apparent that many modifications may be made without departing from the spirit and scope of my invention, I intend by the appended claims to cover all such modifications that fall within the true spirit and scope of my invention.

What I claim as new and desire to secure by Letters Patent of the United States is as follows:

1. A bearing assembly comprising a bearing member having a bearing surface adapted for supporting a complementary surface of another member for relative movement therebetween, and a lubricant reservoir formed of a body of lubricant absorbent ceramic material and having a surface thereof contacting said bearing member and adapted to feed lubricant thereto, said lubricant reservoir providing support for said bearing member.

2. A bearing assembly comprising a bearing member having a porous bearing surface adapted for supporting a complementary surface of another member for relative movement therebetween, and a lubricant reservoir comprised of a body of lubricant absorbent ceramic material, said lubricant reservoir having a glazed surface adapted to prevent loss of lubricant from said reservoir and said lubricant reservoir having an unglazed surface engaging said bearing member and adapted to feed lubricant to said bearing member.

3. In a bearing assembly having a bearing member and a shaft member rotatably journaled in said bearing member, a lubricant reservoir comprised of a body of lubricant absorbent ceramic material formed with an opening therethrough for receiving said bearing member, said bearing member being fixedly disposed in said opening, said lubricant reservoir having an unglazed surface within said opening adapted to feed lubricant to one of said members and said lubricant reservoir having a glazed surface impervious to said lubricant and arranged so that said lubricant is retained within said reservoir.

4. In a dynamoelectric machine: a frame, a stator core member mounted having formed therein a rotor bore, a rotor disposed in said bore, a shaft rigidly associated with said rotor, a bearing member, said shaft being rotatably journaled in said bearing member, a lubricant reservoir comprised of a body of lubricant absorbent ceramic material and having an opening formed therein, said bearing member being disposed in said opening and fixedly supported therein, means connecting said lubricant reservoir in fixed relationship with said stator core member, and said opening in said lubricant reservoir having a surface in contact with said bearing member and adapted to feed lubricant thereto.

5. In the dynamoelectric machine as set forth in claim 4 wherein said lubricant reservoir is provided with a glazed impervious coating of ceramic material to prevent contamination and loss of lubricant, said surface in contact with said bearing being unglazed.

6. In a dynamoelectric machine: a frame, a stator core member mounted in said frame and having a rotor receiving bore formed therein, a rotor disposed in said bore, a shaft extending outwardly of said rotor, a bearing member, said shaft being rotatably journaled in said bearing member, a lubricant reservoir formed of a body of lubricant absorbent ceramic material and having an opening formed therein, said bearing member being fixedly disposed in said opening and said frame having an end shield portion supporting said lubricant reservoir, said body of lubricant absorbent ceramic material having a part thereof engaging said bearing member for feeding lubricant thereto, and means including a fan associated with said rotor for ventilating said machine, said reservoir being formed with a plurality of ventilating openings to allow passage of cooling fluid therethrough.

7. In the dynamoelectric machine as set forth in claim 6 wherein said lubricant reservoir is provided with a glazed impervious coating to prevent contamination and loss of oil from said lubricant reservoir, said part thereof engaging said bearing member being unglazed.

8. In an electric motor having a rotor, a stator, and a shaft mounting said rotor, a pair of bearing assemblies disposed respectively on opposite sides of said motor for mounting said shaft and lubricating the journal surfaces thereof, said bearing assemblies each comprising a porous bearing member rotatably supporting said shaft, a lubricant resevoir formed of a body of lubricant absorbent ceramic material and having an opening formed therein for fixedly supporting said bearing member, said bearing member being disposed in said opening and engaging at least a portion of the surface area of said opening whereby lubricant is fed thereto by capillary action.

9. For use with a bearing assembly: a lubricant reservoir comprising a body of lubricant absorbent ceramic material having at least a portion thereof arranged for contact with a porous bearing member and adapted to feed lubricant to the bearing assembly, said surface area of said body of lubricant absorbent ceramic material being substantially covered with a lubricant impervious ceramic glaze to prevent contamination and loss of lubricant therefrom, said portion adapted to feed lubricant to said bearing assembly being unglazed.

10. In a dynamoeletctric machine: a stationary member including a stator core having formed therein a rotor bore, a rotor disposed in said bore, a shaft rigidly associated with said rotor, a bearing section journaling said shaft, and a lubricant reservoir section supporting said bearing section, at least one of said sections being formed of porous lubricant absorbent ceramic material, said lubricant reservoir section feeding lubricant to said bearing section during rotation of said shaft relative to said bearing section, and at least a portion of the surface area of said lubricant reservoir engaging said bearing member whereby lubricant is fed thereto by capillary action.

References Cited in the file of this patent
UNITED STATES PATENTS

| | | |
|---|---|---|
| 2,625,452 | Haller | Jan. 13, 1953 |
| 2,665,960 | Causley | Jan. 12, 1954 |
| 2,824,773 | Bontempi | Feb. 25, 1958 |
| 2,922,682 | Abel | Jan. 26, 1960 |
| 3,074,768 | Abel | Jan. 22, 1963 |